United States Patent
Kuiper (10) Patent No.: US 8,649,060 B2
(45) Date of Patent: Feb. 11, 2014

(54) METHOD OF HALFTONING FOR ASYMMETRIC PRINT RESOLUTIONS AND A PRINTER

(71) Applicant: OCE-Technoligies B.V., Venlo (NL)

(72) Inventor: Paul Kuiper, Eindhoven (NL)

(73) Assignee: Oce Technologies B.V., Venlo (NL)

( * ) Notice: Subject to any disclaimer, the term of this patent is extended or adjusted under 35 U.S.C. 154(b) by 0 days.

(21) Appl. No.: 13/770,597

(22) Filed: Feb. 19, 2013

(65) Prior Publication Data

US 2013/0188225 A1 Jul. 25, 2013

Related U.S. Application Data

(63) Continuation of application No. PCT/EP2011/065358, filed on Sep. 6, 2011.

(30) Foreign Application Priority Data

Sep. 20, 2010 (EP) .................................. 10177547

(51) Int. Cl.
*H04N 1/40* (2006.01)
(52) U.S. Cl.
USPC ......... 358/3.06; 358/1.9; 358/3.01; 358/3.02; 358/3.09; 358/3.1; 358/3.11; 358/3.12; 358/3.17; 358/3.2; 358/3.23; 358/3.26
(58) Field of Classification Search
None
See application file for complete search history.

(56) References Cited

U.S. PATENT DOCUMENTS

| | | | | |
|---|---|---|---|---|
| 5,966,507 A | * | 10/1999 | Lin | ................................. 358/1.9 |
| 6,203,133 B1 | | 3/2001 | Tanaka et al. | |
| 6,608,701 B1 | | 8/2003 | Loce et al. | |
| 2002/0191829 A1 | * | 12/2002 | Sasada | ........................ 382/132 |
| 2004/0150841 A1 | * | 8/2004 | Lieberman et al. | ............ 358/1.2 |
| 2006/0066908 A1 | * | 3/2006 | Kim | ................................. 358/3.2 |
| 2008/0018662 A1 | * | 1/2008 | Gazeley | ........................ 345/601 |

FOREIGN PATENT DOCUMENTS

EP     1 519 565 A2    3/2005

* cited by examiner

*Primary Examiner* — Miya J Cato
(74) *Attorney, Agent, or Firm* — Birch, Stewart, Kolasch & Birch, LLP (57) ABSTRACT

A method of printing an image by a printer having an asymmetric printer resolution includes multi-level halftoning the image by assigning a level out of a number of levels to each pixel of the image. The method further includes determining the number of levels on the basis of the asymmetric printer resolution, selecting for each level a collection of at least one binary pattern, each binary pattern consisting of a plurality of sub-pixels the number of which is determined by the number of levels, selecting for each pixel of the halftoned image a binary pattern from the collection selected for the level assigned to the pixel, transforming each pixel of the halftoned image into the selected binary pattern, and printing the binary patterns of the transformed pixels using the asymmetric printer resolution. A printer is configured to perform the method.

11 Claims, 9 Drawing Sheets

METHOD OF HALFTONING FOR ASYMMETRIC PRINT RESOLUTIONS AND A PRINTER

CROSS-REFERENCE TO RELATED APPLICATIONS

This application is a Continuation of International Application No. PCT/EP2011/065358, filed on Sep. 6, 2011, and for which priority is claimed under 35 U.S.C. §120, and which claims priority under 35 U.S.C. §119 to Application No. 10177547.6, filed in Europe on Sep. 20, 2010. The entirety of each of the above-identified applications is expressly incorporated herein by reference.

BACKGROUND OF THE INVENTION

1. Field of the Invention

The present invention relates to a method of printing an image by a printer having an asymmetric printer resolution, said method comprising the step of multi-level halftoning the image by assigning a level out of a number of levels to each pixel of the image. The present invention also relates to a printer, which is able to apply the method according to the present invention.

2. Background of the Invention

Printers are known, which are able to print an image on a receiving medium and comprise a processor unit for controlling print parameters with respect to printing the image and for performing calculations like halftoning with respect to printing of the image.

Such print parameters may, for example, be a velocity of a carriage on which the print head is positioned, a jet frequency with which ink drops are ejected from printing elements of the print head and a drop size of the ink drops ejected from printing elements of the print head, if a printer with the capability of ejecting ink drops of different drop sizes is used.

Nowadays, print heads of printers are using smaller and smaller sizes of ink drops and higher and higher jet frequencies. This is advantageous, since a sharper, less dingy image is achieved with the same productivity. To stay at a same level of productivity, the velocity of the carriage may not increase too much, since the productivity will decrease because of the large amount of time due to the reversal time of the carriage. To overcome this problem, an image may be printed by a higher resolution in the direction of a movement of the carriage than in the paper step direction. This results in an asymmetric printer resolution of for example 2400 dpi by 300 dpi, meaning a resolution of 2400 dpi in the direction of the movement of the carriage and a resolution of 300 dpi in the paper step direction. Known halftoning algorithms cannot easily manage such extreme asymmetric print resolutions. Artifacts may appear by which line structures become visible in the direction of the movement of the carriage.

A solution for this problem may be found in generating different pulse forms in the driving electronics of the print heads to create ink drops of different sizes. Such a pulse form is often a concatenation of driving pulses to achieve a large enough ink drop. The jet frequency will decrease and thus the velocity of the carriage may decrease. However, such a design of the driving electronics is cumbersome and control over the outcome of a concatenation of driving pulses is limited.

SUMMARY OF THE INVENTION

It is an object of the present invention to provide a method according to which images are printed with an asymmetric printer resolution without a reduction in print quality.

According to the present invention, this object is achieved by a method of printing an image by a printer having an asymmetric printer resolution, said method comprising the step of: multi-level halftoning the image by assigning a level out of a number of levels to each pixel of the image; determining the number of levels on the basis of the asymmetric printer resolution; selecting for each level a collection of at least one binary pattern, each binary pattern consisting of a plurality of sub-pixels, the number of which is determined by the number of levels; selecting for each pixel of the halftoned image a binary pattern from the collection selected for the level assigned to the pixel; transforming each pixel of the halftoned image into the selected binary pattern; and printing the binary patterns of the transformed pixels using the asymmetric printer resolution.

The multi-level halftoning delivers a bitmap, each pixel of which has a level out of the number of levels, for example for each of four colors (CMYK). Before halftoning the bitmap, the number of levels is determined on the basis of the asymmetric printer resolution. For each level being an outcome of the multi-level halftoning step, a collection of binary patterns is selected, each binary pattern consisting of a plurality of sub-pixels, the number of which is determined by the number of levels. For each pixel of the halftoned image, a binary pattern is selected from the collection of binary patterns, which corresponds to the level assigned to the pixel. The pixel with its level is transformed into the corresponding binary pattern. A sub-pixel of the binary pattern may have a value of one or zero. A sub-pixel with a value of zero is not intended to be printed, while a sub-pixel with a value of one is intended to be printed. The selection of the binary pattern from the collection of binary patterns may be determined by the following rule: the higher the level of the pixel, the higher the number of sub-pixels that has the value of one, meaning, that will be printed by an ink drop.

For example, in case of a printer resolution of 300 dpi by 2400 dpi, the number of levels may be 2400/300+1, equaling nine. By applying the method using nine levels, a 300 dpi by 300 dpi image is transformed into a 300 dpi by 2400 dpi binary image by filling a binary pattern of eight sub-pixels per pixel of the original image. Note that the number of nine levels is one more than a quotient 2400/300 directly derived from the asymmetric printer resolution, since an extra level is assigned to the situation when no ink drop has to be printed. The binary patterns of the transformed pixels are printed by the printer at the asymmetric printer resolution.

By doing so, the known concatenation of pulses is replaced by pre-processing of the image. The great advantage is that a simpler print head design is achieved, since by applying this method, a binary print head may act like a multi-drop print head. Moreover, by selecting appropriate binary patterns, more control over the pulses and the distribution of the ink is achieved.

According to an embodiment of the method of the present invention, a sub-pixel of a binary pattern of a transformed pixel has a value of zero or one, which binary pattern has as many sub-pixels with a value of one as the level assigned to the corresponding pixel of the halftoned image. Therefore, a one-to-one correspondence exists between the level of the pixel and the number of sub-pixels with a value of one. In the case of eight sub-pixels per binary pattern, there are nine levels. A level of zero corresponds to a binary pattern of zero sub-pixels with a value of one: all sub-pixels have a value of zero. A grey level of eight corresponds to a binary pattern of eight sub-pixels with a value of one: all sub-pixels have a value of one. For a grey level from one to seven the number of binary patterns is larger than one. In general, the number of binary patterns corresponding to a grey level x, where x ranges from zero to a predetermined number y of levels, is equal to a binomial coefficient usually noted as C(y, x) equaling y!/(x!(y−x)!).

A look-up table may be constructed by an image processor of the printer to associate a level with an appropriate binary pattern. Such a look-up table may differ per print head technology.

According to an embodiment of the method of the present invention, the step of selecting for each level a collection of at least one binary pattern is according to at least one pattern fill order of as many steps as the level corresponding to the selected collection, said at least one pattern fill order starting with a binary pattern of sub-pixels all having a value of zero and each step changing the value of zero of a sub-pixel of the binary pattern into a value of one.

The transformation of a level of a pixel into a binary pattern may be achieved according to the pattern fill order. Since the number of steps of the pattern fill order is as much as the level of the pixel, all levels are covered by the binary patterns achieved by the steps.

According to an embodiment of the method of the present invention, the binary pattern is different for pixels of the halftoned image corresponding to the same level. This is especially advantageous when the printer has more than one print head or has one printhead with at least two rows of printing elements. In a case of two print heads, one print head may be configured to print the odd sub-pixels in each pixel and the other print head may be configured to print the even sub-pixels in each pixel. If for each pixel of the halftoned image assigned to the same level the same binary pattern would be applied, a problem would arise for low density areas of the image. Suppose a lot of neighboring pixels have a level of one, only one print head would be ejecting ink drops, since the sub-pixel of the binary pattern to be printed for a pixel having a level of one is the same for each pixel. By selecting different binary patterns for neighboring pixels, the sub-pixel to be printed for a pixel of level one differs for neighboring pixels. When two different binary patterns are used, this will lead to a row of alternating binary patterns corresponding to a row of pixels in the image. This may also be applied to the selection of the binary patterns corresponding to a column of pixels in the image. The difference in which sub-pixels are activated in which level may also be achieved by selecting different pattern fill orders for neighboring pixels of the halftoned image.

According to an embodiment of the method of the present invention, the binary pattern of a pixel is determined by the levels of neighboring pixels of the pixel. The pixel has a level for which a collection of binary patterns is selected. A selection of a binary pattern from this collection for the pixel may depend on a center of mass of the binary pattern. For each binary pattern, the center of mass of a binary pattern may be calculated from the positions of the sub-pixels having a value of one in the binary pattern. For the pixel, a binary pattern may be selected, which has a desired center of mass. To determine which center of mass is desired, levels of the neighboring pixels may be taken into account. For example, by looking at the level of a left neighboring pixel and the level of a right neighboring pixel, the center of mass of the binary pattern of the pixel in the middle of the left neighboring pixel and the right neighboring pixel may be determined. If the level of the left neighboring pixel is higher than the level of the right neighboring pixel, the center of mass desired may be on the left side of a binary pattern to be selected for the pixel. If the level of the right neighboring pixel is higher than the level of the left neighboring pixel, the center of mass desired may be on the right side of a binary pattern to be selected. If the level of the right neighboring pixel is equal to the level of the left neighboring pixel, the center of mass desired may be on the middle of a binary pattern to be selected. This is advantageous since sub-pixels of binary patterns of neighboring pixels are clustered as much as possible. Sub-pixels are 'drawn' to the darker areas in the image. Therefore lines and text in the image become sharper, especially if these lines and text have been aliased by a render engine of the printer or a scanner incorporated in the printer. The desired center of mass may not be present in the selected collection of binary patterns for the level of the pixel. By means of 'shifting' sub-pixels having a value of one in a binary pattern of the collection, the desired center of mass may be achieved. For example, by looking at the level of a left neighboring pixel and the level of a right neighboring pixel, the center of mass of an already selected binary pattern of the pixel in the middle of the left neighboring pixel and the right neighboring pixel may be shifted, by 'shifting' the sub-pixels having a value of one to the left or the right of the binary pattern, leaving the level of the pixel the same. If the level of the left neighboring pixel is higher than the level of the right neighboring pixel, the sub-pixels having a value of one may be shifted to the left of the binary pattern. If the level of the right neighboring pixel is higher than the level of the left neighboring pixel, the sub-pixels having a value one may be shifted to the right.

According to an embodiment of the method of the present invention, the method further comprises the steps of identifying binary patterns that induce print artifacts during printing and excluding the identified binary patterns from any collection of at least one binary pattern. When printing of a binary pattern interferes with characteristics of a print head of the printer, the print head may become instable and print artifacts may appear on the printed image. Characteristics of a print head which determine the possible emerging of print artifacts may be a jet frequency (DOD frequency), a jet velocity and a kind of printing elements like nozzles. A binary pattern may be selected in such a way that instability of the print head is prevented. The applicant has noticed that a binary pattern including a certain frequency of sub-pixels with a value of one and sub-pixels with a value of zero may lead to interference with a drop on demand frequency of the print head. Such interference may lead to a high degree of nozzle plate wetting, resulting in large drop positioning errors or to jet speed deviations. Therefore, binary patterns may be selected, which do not contain undesired frequencies. If such binary patterns are part of a collection of binary patterns, those undesired binary patterns are excluded from the collection. If a pixel and a neighboring pixel of an image use respectively a first binary pattern and a second binary pattern, such frequencies may also be avoided in the combination of the binary patterns, for example, at the end of the first binary pattern and the beginning of the second binary pattern. Desired and undesired binary patterns may be different per kind of print head technology, or even per kind of print head serial production batch.

The present invention also discloses a printer comprising a print controller and a print engine, wherein the print controller is configured to carry out the halftoning step, the selection steps and the transformation step according to any of the preceding embodiments of the method and the print engine is configured to carry out the printing step according to any of the preceding embodiments of the method.

According to an embodiment of the printer, the printer comprises an image processor unit adapted to carry out the halftoning step, the determining step, the selection steps and the transformation step according to any of the preceding embodiments of the method. The image processor may be comprised in the print controller of the printer or the print engine of the printer.

The invention also discloses a computer program comprising computer program code embodied on a non-transitory computer readable medium and configured to enable a printer according to any of the printer embodiments described hereinabove in order to execute the method of any of the preceding embodiments of the method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements are identified with the same reference numeral.

Figure 1:
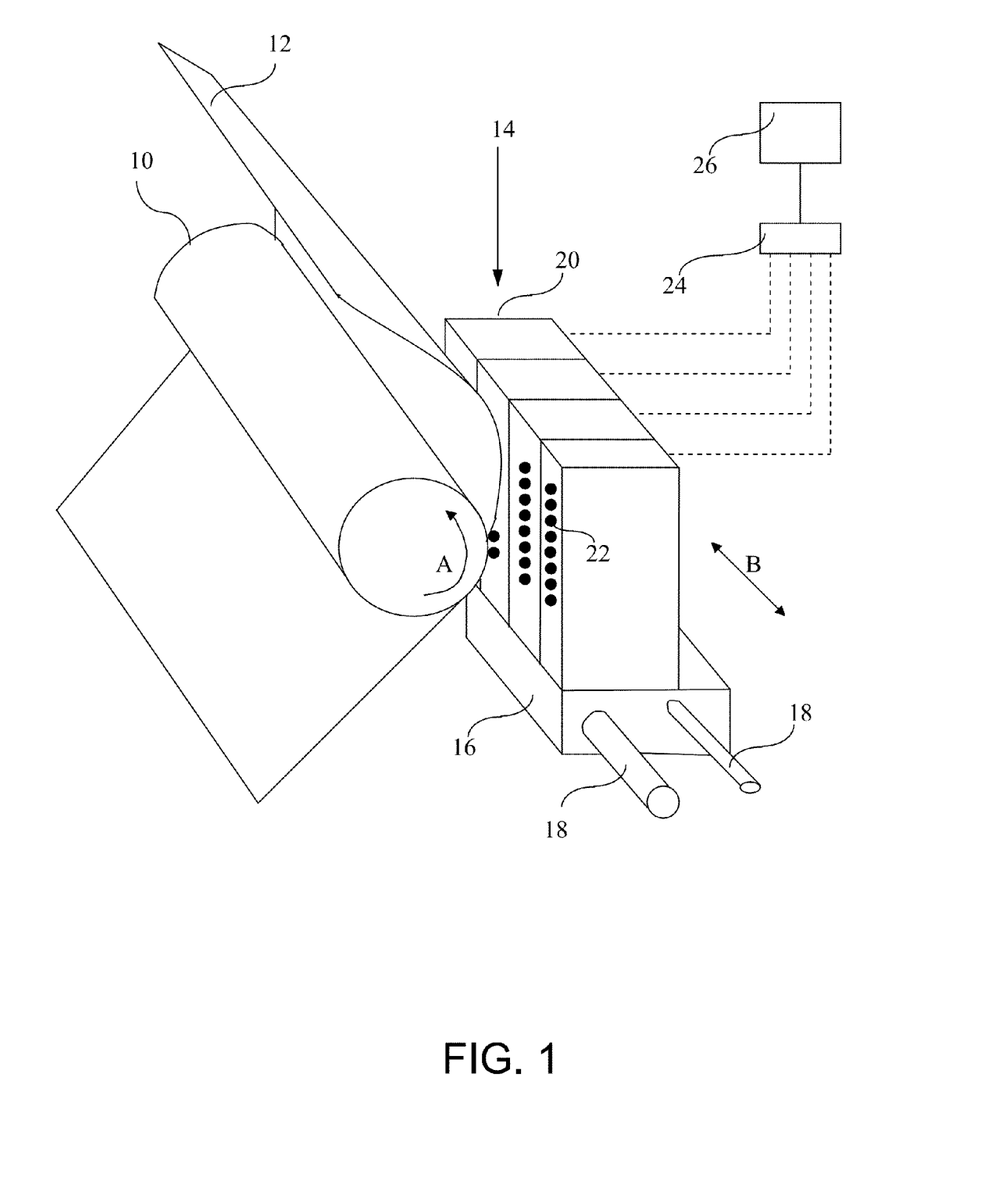
FIG. 1 is a schematic view of an ink jet printer to which the present invention is applicable.

FIG. 1 shows an ink jet printer, which comprises a platen 10 that serves for transporting a recording paper 12 in a paper step direction (arrow A) past a print head unit 14. The print head unit 14 is mounted on a carriage 16 that is guided on guide rails 18 and is movable back and forth in a direction perpendicular to the paper step direction (arrow B) relative to the recording paper 12. In the example shown, the print head unit 14 comprises four print heads 20, one for each of the basic colors cyan, magenta, yellow and black. Each print head has a linear array of nozzles 22 extending in the sub-scanning direction. The nozzles 22 of the print heads 20 can be energized individually to eject ink droplets onto the recording paper 12, thereby to print a pixel on the paper. When the carriage 16 is moved in the direction B across the width of the paper 12, a swath of an image can be printed. The number of pixel lines of the swath may correspond to the number of nozzles 22 of each print head. When the carriage 16 has completed one pass, the paper 12 is advanced by at most the width of the swath, so that the next swath can be printed.

The print heads 20 are controlled by a print head controller 24, which receives print data in the form of a multi-level pixel matrix from an image processor 26 that is capable of high speed image processing. The image processor 26 may be incorporated in the printer or in a remote device, e.g. a print driver in a host computer. The print head controller 24 and the image processor 26 process the print data in a manner that will be described in detail hereinafter. The discussion is focused on printing in black color, but is equivalently valid for printing in the other colors.

The method of the present invention may also be applied in printers with a page-wide print head, a single pass printer, an electro-graphical printer, a laser printer or any other kind of inkjet printer than shown in FIG. 1. In case of a printer printing with another marking material than ink, hereinafter ink may be replaced by the other marking material used by the printer, for example a toner.

Figure 2:
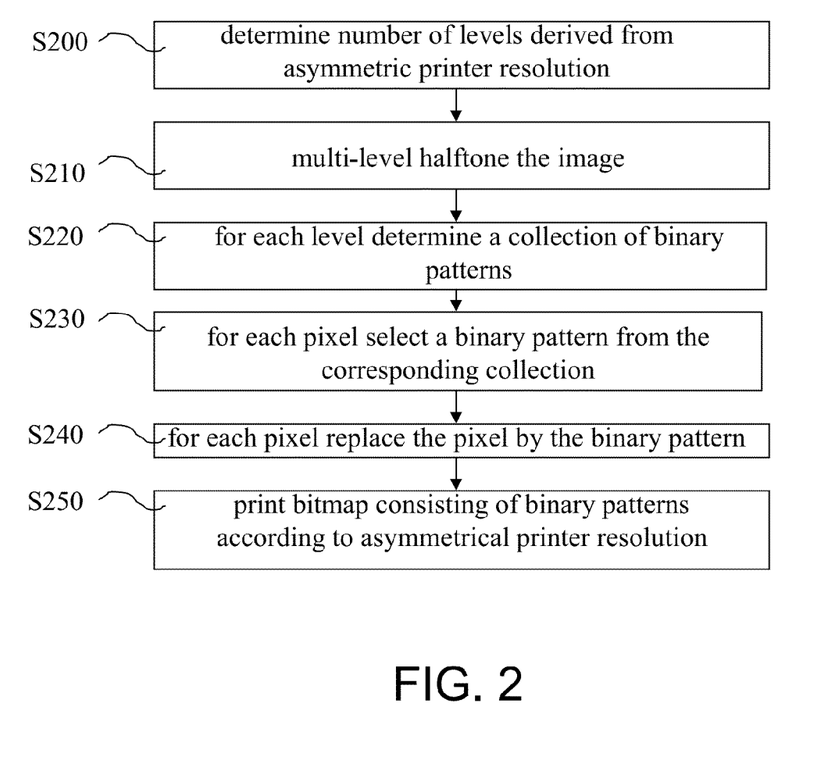
FIG. 2 is a flow diagram of the method according to the present invention.

FIG. 2 is a flow diagram of an embodiment of the method according to the present invention. Steps S200-S250 of the method are explained hereinafter.

Figure 3:
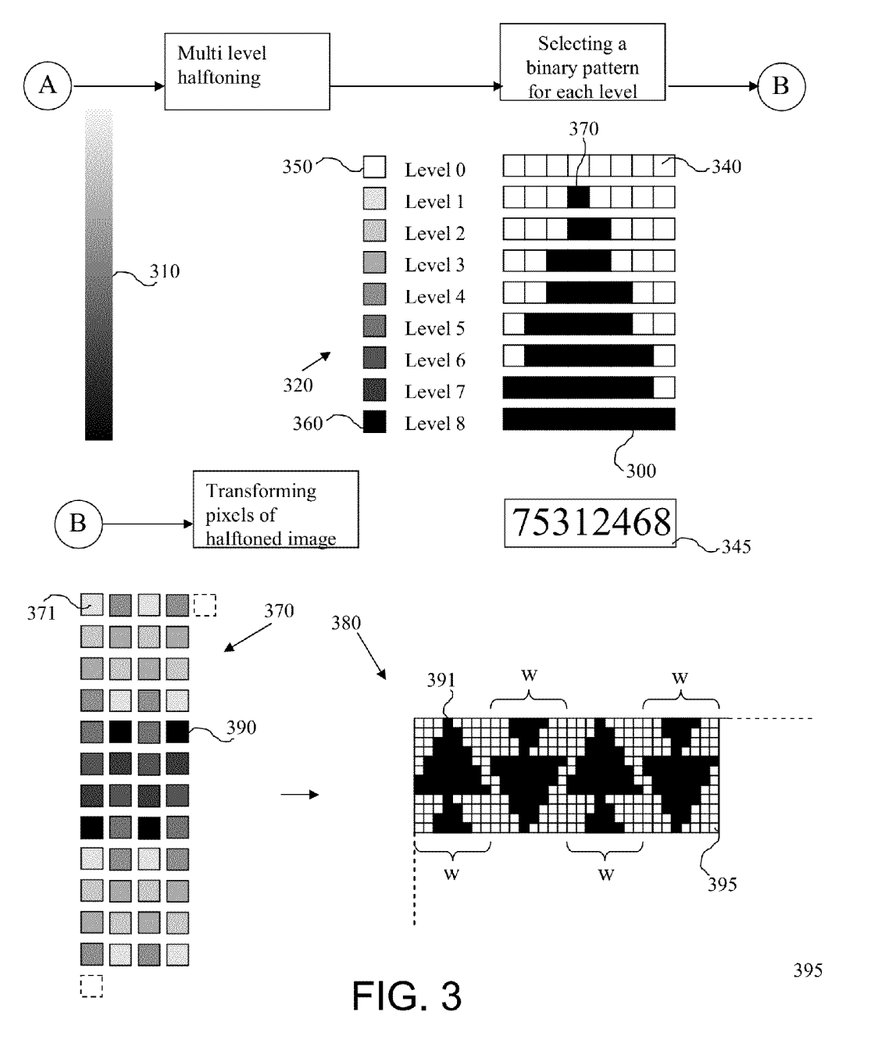
FIG. 3 is a schematic view of the steps of the method according to the invention.

FIG. 3 is a schematic view of the steps of the method according to the present invention. Starting point A may be a continuous tone image to be printed, for example represented by 8 bits per pixel. Starting point A may also be a grey-scaled bitmap. A representation of the possible grey scale colors is shown as a column 310 on the left side of FIG. 3. The method may be applied on any bitmap, which includes per pixel a grey value out of a plurality of different grey values ranging from a value representing a white color to a value representing a black color.

Since a multi-level halftoning is going to be applied, the number of levels of the multi-level halftoning technique is determined in a first step S200. This determination is on the basis of the asymmetric printer resolution. If, for example, the printer resolution is 300 by 2400 dpi, the number of levels is 2400/300+1 equaling nine levels. In FIG. 3, the nine levels are represented by a column 320 of nine squares. The upper square 350 represents a level of zero corresponding to the color white. The bottommost square 360 represents a level eight corresponding to the color black. In general, in case of an asymmetric printer resolution of m by n dpi, the number of levels may be n/m+1.

In a second step S210, the continuous tone image is halftoned by means of the multi-level halftoning technique. Each pixel of the continuous tone image is transformed into a pixel having a level out of the plurality of levels defined by the multi-level halftoning technique.

In a third step S220, for each level 350, 360 a collection of binary patterns is selected. Each binary pattern of the selected collection consists of a number of sub-pixels, which number is determined by the number of levels. By doing so, there is a one-to-one correspondence between the number of levels and the number of selected collections.

A collection of binary patterns with x sub-pixels having a value of zero and 8-x sub-pixels having a value of one may at most contain $C(8,x)=8!/((8-x)!x!)$ binary patterns. For example, the collection of binary patterns corresponding to level 4 may contain $C(8,4)=840$ binary patterns, while each collection of binary pattern corresponding respectively to a level 0 and a level 8 contain $C(8,0)=C(8,8)=1$ binary pattern.

In a fourth step S230, for each level a desired binary pattern is selected from the corresponding collection of binary patterns. In FIG. 3, for each collection—and thus for each level—a binary pattern is selected consisting of a number of sub-pixels 340, the number (eight) of which is determined by the number of levels (eight plus one).

In a preferred embodiment of the method according to the present invention, each of the sub-pixels 340, 370 has a value of zero or one represented respectively by a white square and a black square, and the binary pattern has as many sub-pixels with a value of one as the corresponding level. This embodiment is shown in FIG. 3. A first binary pattern corresponding to level zero has no sub-pixels having a value of one, a second binary pattern corresponding to level one has one sub-pixel 370 having a value of one, and so on until in a last binary pattern 300 corresponding to level eight all sub-pixels have a value of one.

In a fifth step S240 of the method according to the present invention, each pixel 390 of the halftoned image 370 is replaced by the corresponding binary pattern with a width w of eight sub-pixels. The resulting binary image 380 is eight times wider than the halftoned image 370. Each sub-pixel 391, 395 of a binary pattern of the resulting binary image 380 has a value of zero or one according to the binary pattern.

In a sixth step S250 of the method according to the present invention, the resulting binary image 380 is printed by the printer according to the asymmetric printer resolution. The asymmetric resolution corresponds to the widening of the resulting binary image 380. Therefore, the width of the image printed by the printer with the asymmetric printer resolution, for example of 300 by 2400 dpi, is the same width as of the original image printed with a printer having a symmetric resolution, for example of 300 by 300 dpi. By doing so no deformation of the image occurs.

In an embodiment of the method according to the present invention, the step of selecting the binary patterns is according to a pattern fill order of as many steps as a level corresponding to a selected binary pattern, said order starting with a binary pattern of sub-pixels all having a value of zero and each step changing the value of zero of a sub-pixel of the binary pattern into a value of one.

As shown in FIG. 3, starting point is a binary pattern with all sub-pixels 340 having a value of zero corresponding to level zero. In a first step of the pattern fill order, a value of zero of a fourth sub-pixel 371 from the left of the binary pattern is changed into a value of one resulting in a binary pattern corresponding to level one. In a second step of the pattern fill order, a value of zero of a fifth sub-pixel 372 from the left of the binary pattern corresponding to level one is changed into a value of one resulting in a binary pattern corresponding to level two. In a third step of the pattern fill order, a value of zero of a third sub-pixel 373 from the right of the binary pattern corresponding to level two is changed into a value of one resulting in a binary pattern corresponding to level three. The changing of values of sub-pixels continues until the values of all sub-pixels are changed.

Such a fill order may be represented by a row of the numbers 1 to n, where n is the number of sub-pixels of a binary pattern. For example, a pattern fill order, which is applied to the binary patterns shown in FIG. 3, is represented by a row 345 of digits of the number 75312468. A digit of the number 75312468 having a value of 1 is the fourth digit from the left of the number 75312468. This means that a fourth sub-pixel 371 from the left of an initial binary pattern having sub-pixels, which all have a value of zero, obtains a value of one in order to form the first binary pattern corresponding to level one. A digit of the number 75312468 having a value of 2 is the fifth digit from the left of the number 75312468. This means that both the fourth sub-pixel 371 and a fifth sub-pixel 374 from the left of the binary pattern obtain a value of one in order to form the second binary pattern corresponding to level two, and so on until a binary pattern 300 of level eight is reached.

The pattern fill order 345 according to the number 75312468 may be applied to the pixels 390 of the halftoned image 370. The halftoned image 370 is transformed into a bitmap 380 consisting of a matrix of binary patterns. Each of the binary patterns in the bitmap 380 has eight sub-pixels and corresponds to a pixel in the halftoned image 370. For example, a binary pattern in the upper left corner of the bitmap 380 corresponds to a pixel 371 having level one in the upper left corner of the halftoned image 370. The binary pattern in the upper left corner of the bitmap 380 has seven sub-pixels having a value of zero and one sub-pixel 391 having a value of one. The latter sub-pixel 391 is the fourth sub-pixel from the left of the binary pattern in the upper left corner of the bitmap 380 according to the binary pattern of level one derived from the pattern fill order 345.

Figure 4A:
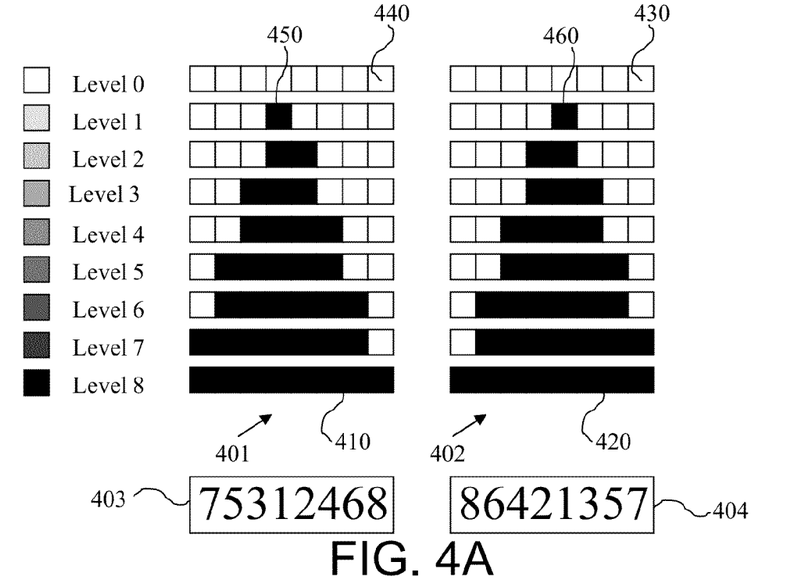
FIGS. 4A-4G are schematic representations of pattern fill orders.

In FIG. 4A, a first pattern fill order 403 and a second pattern fill order 404 are shown. The first pattern fill order 403 is represented by a number 75312468 equaling the pattern fill order 345 shown in FIG. 3. The second pattern fill order 404 is represented by a number 86421357, the reversal of the number 75312468. It is noted that a sub-pixel 450 of a first binary pattern corresponding to level one generated by the first pattern fill order 403 has a value of one and is on an even position, i.e. fourth position, in the first binary pattern, while a sub-pixel 460 of a second binary pattern corresponding to level one generated by the second pattern fill order 404 has a value of one and is on an odd position, i.e. fifth position, in the second binary pattern.

Hereinafter, it is explained that the use of binary patterns generated by only one pattern fill order 403 may lead to undesired situations.

Figure 4B:
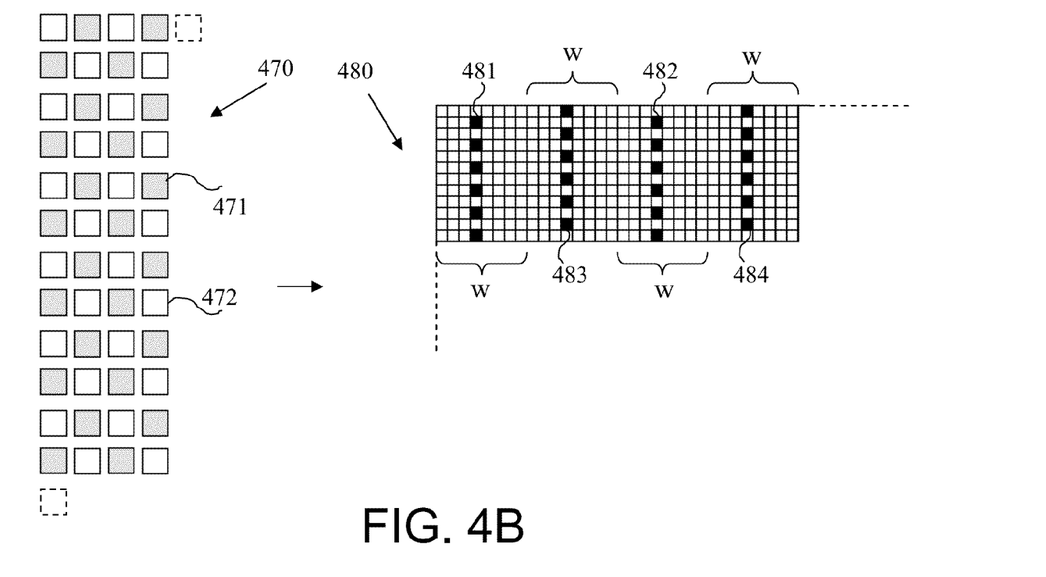

An example of such an undesired situation is when a halftoned image 470 shown in FIG. 4B is going to be printed by the printer. The halftoned image 470 has only pixels of level one or zero. All sub-pixels 481-484 of the binary patterns having a value of one in a resulting bitmap 480 are on even positions in the binary patterns. It is assumed that the printer has two print heads and is configured to let the first print head print all even sub-pixels in the bitmap 480 and to let the second print head print all odd sub-pixels in the bitmap 480. When the halftoned image 470 is printed, all sub-pixels 481-484 of the bitmap 480 having a value of one are printed by the first print head, while all pixels having a value zero are not printed at all. This means that the first print head does all the printing, while the second print head is doing nothing. Therefore the use of the print heads is not balanced, which may lead to a premature end-of-life time of the first print head or color bundling by the first print head, since the coverage achieved by the first print head may increase. This situation of unbalanced print heads elaborated upon here-above is extreme, but may also emerge when printing halftoned images with most of the pixels having the same level, especially the odd levels 1, 3, 5 and 7 of FIG. 3.

Figure 4C:
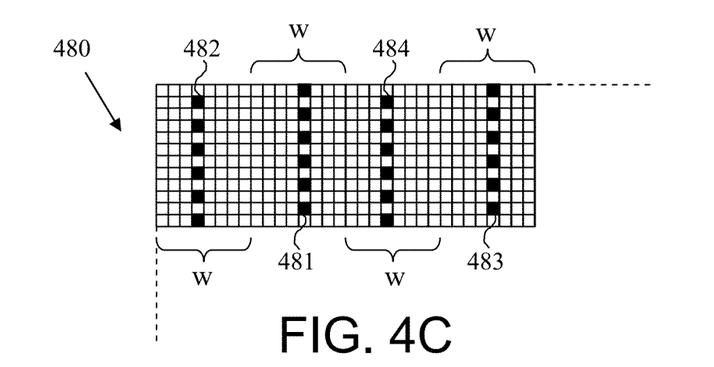

This not desired situation may be avoided by applying an embodiment of the method according to the present invention in which there is more than one pattern fill order, for example the first pattern fill 403 and the second pattern fill order 404, are used instead of one pattern fill order 345 shown in FIG. 3. The first pattern fill order 403 may be used for the even pixels in the halftoned image 470 and the second pattern fill order 404 may be used for the odd pixels in the halftoned image 470. A resulting bitmap 490 is shown in FIG. 4C. The halftoned image 470 is transformed by means of the two pattern fill orders 403, 404 into the second bitmap 481. The second bitmap 481 may be printed by the printer and the load for the first print head and the second print head is balanced. Even sub-pixels 492, 494 of binary patterns corresponding to level one are printed by the first print head while odd sub-pixels 491, 493 of binary patterns corresponding to level one are printed by the second print head. It is noted that the first pattern fill order 403 and the second pattern fill order 404 are constructed in such a way that the use of these two pattern fill orders 403, 404 in the described way may also avoid unbalanced print heads when printing images of which most of the pixels have a same odd level 1, 3, 5 or 7, or have a mix of the odd levels 1 and 5, or of the odd levels 3 and 7. Other pattern fill orders may be selected to be applied which also lead to a balanced use of the print heads of the printer. Also, a combination of more than two pattern fill orders may be applied.

In the case of a printer with printer resolution of 300 by 2100 dpi, the pattern fill order 7531246 uses binary patterns of seven sub-pixels. In the case of a printer with printer resolution of 300 by 2700 dpi, the pattern fill order 975312468 uses binary patterns of nine sub-pixels. Generally, if the number of sub-pixels in the binary patterns is odd, only one pattern fill order will be sufficient.

Figure 4D:
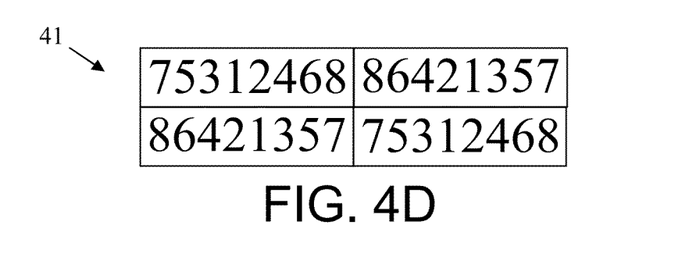

In the case of a printer with printer resolution of 300 by 2400 dpi, the pattern fill orders 75312468 and 86421357 may be used for neighboring pixels in the resulting bitmap. Neighboring pixels may be subsequent in the same row and/or subsequent in the same column. Combining the two pattern fill orders in both the row and column direction of the bitmap may lead to a two-dimensional pattern fill order 41 as shown in FIG. 4D.

Figure 4E:
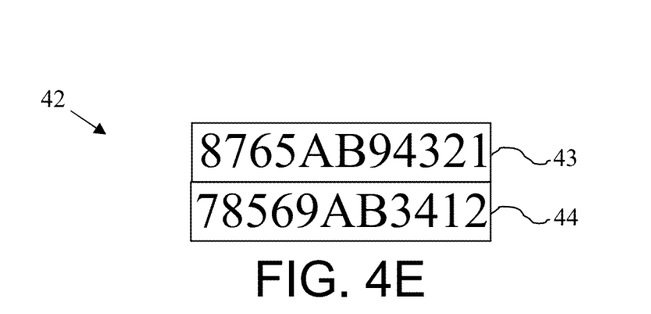

Also, a pattern fill order 42 for binary patterns of 11 sub-pixels may be designed as shown in FIG. 4E, in which two pattern fill orders 43, 44 are combined in subsequent rows of the bitmap. The letters A and B in the two pattern fill orders 43, 44 respectively represent the numbers 10 and 11.

Figure 4F:
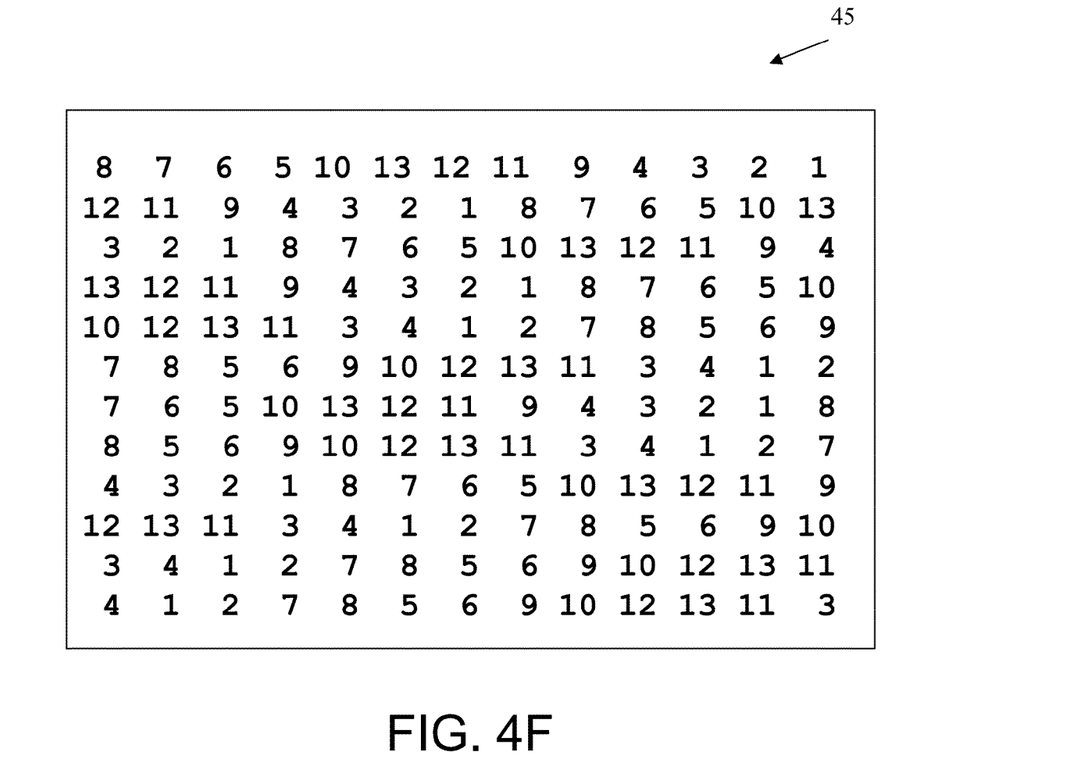

FIG. 4F shows another two-dimensional pattern fill order 45 for binary patterns of 13 sub-pixels for 12 subsequent rows of the bitmap.

Figure 4G:
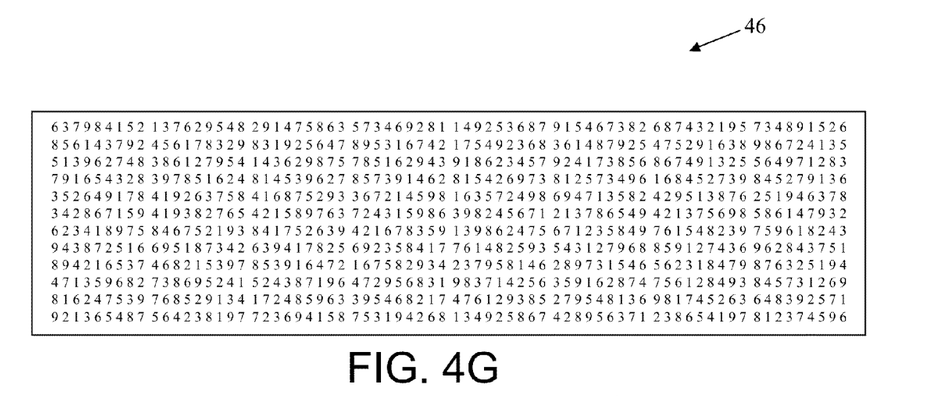

Large random tables may be used as sub-pixel filling masks. FIG. 4G shows a large random table 46 to be used as a sub-pixel filling mask for binary patterns of nine sub-pixels. All permutations or a part of the permutations of the numbers one to nine may be used to randomly position binary patterns corresponding to these permutations in the large table 46. In another embodiment, Latin squares or sudoku squares are used to construct large tables of binary patterns.

According to an embodiment of the present invention, a binary pattern of a pixel is determined by the levels of neighboring pixels of the pixel. In this way, the selection of binary patterns is dependent on the pixel data of the image. As a starting point, a pattern fill order 345 as shown in FIG. 3 may be used. A look-up table may be constructed having an input of the level of a pixel (0-8) and as an output a number related to a desired center of mass. For example, the number is 0, if the desired center of mass is in the middle of a binary pattern, −4 if the desired center of mass is at the uttermost left of the binary pattern, and +4 if the desired center of mass is at the uttermost right of the binary pattern. Thus, the number ranges from −4 to +4. Sub-pixels of a binary pattern having a value of one may be shifted to the left of the binary pattern or the right of the binary pattern to achieve the desired center of mass.

Figure 5A:
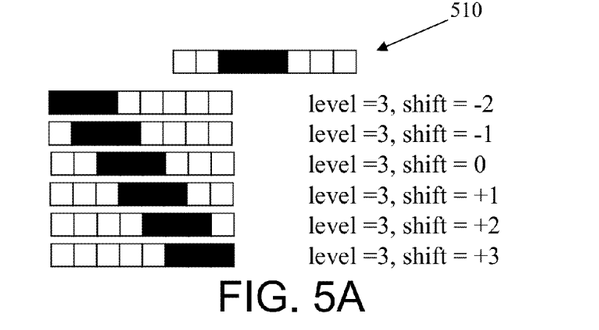
FIGS. 5A and 5B are schematic representations of the principle of shifting a center of mass of a pixel.
Figure 5B:
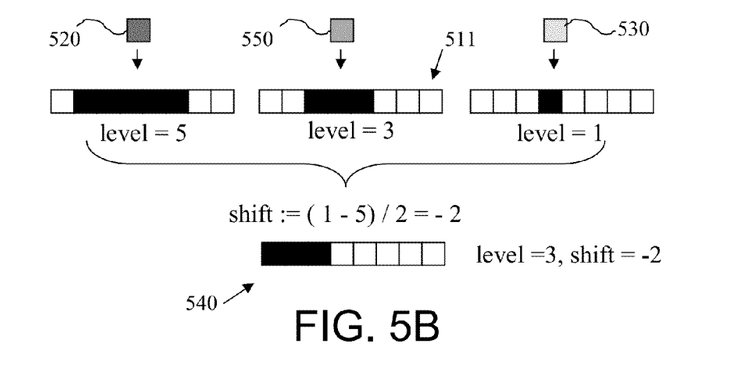

In FIG. 5A, a binary pattern 510 of eight sub-pixels is shown. The binary pattern 510 has three sub-pixels which have a value of one. The binary pattern 510 is applied for pixels in the halftoned image, which have a level 3. Possible shifted binary patterns are also shown in FIG. 5A by applying a shift of respectively −2, −1, 0, +1, +2 and +3. A shift of −3 or −4 may also result in the shifted binary pattern with a shift of −2, while a shift of +4 may also result in the shifted binary pattern with a shift of +3.

A desired center of mass of a binary pattern 511 of a first pixel 550 of the halftoned image may be calculated by taking the difference of a level of a second pixel 520 positioned directly to the left of the first pixel and a level of a third pixel 530 positioned directly to the right of the first pixel, and divide the difference by two. This calculation delivers a shift number between −4 and +4. The shift is then applied to the binary pattern 511 of the first pixel 550, resulting in a shifted binary pattern 540. A binary pattern corresponding to and shown below the second pixel 520 and a binary pattern corresponding to and shown below the third pixel 530 may be selected otherwise from, respectively, the collection of binary patterns corresponding to level 5 and the collection of binary patterns corresponding to level 1.

When applying this calculation to all pixels of the halftoned image, sub-pixels having a value of one are clustering. Sub-pixels of a pixel, which have a value of one are attracted to a darker side of the pixel. This results in sharper lines and text in the printed bitmap, especially if lines and/or text parts are aliased by a render engine being part of the printer or a scanner being part of the printer.

Figure 6:
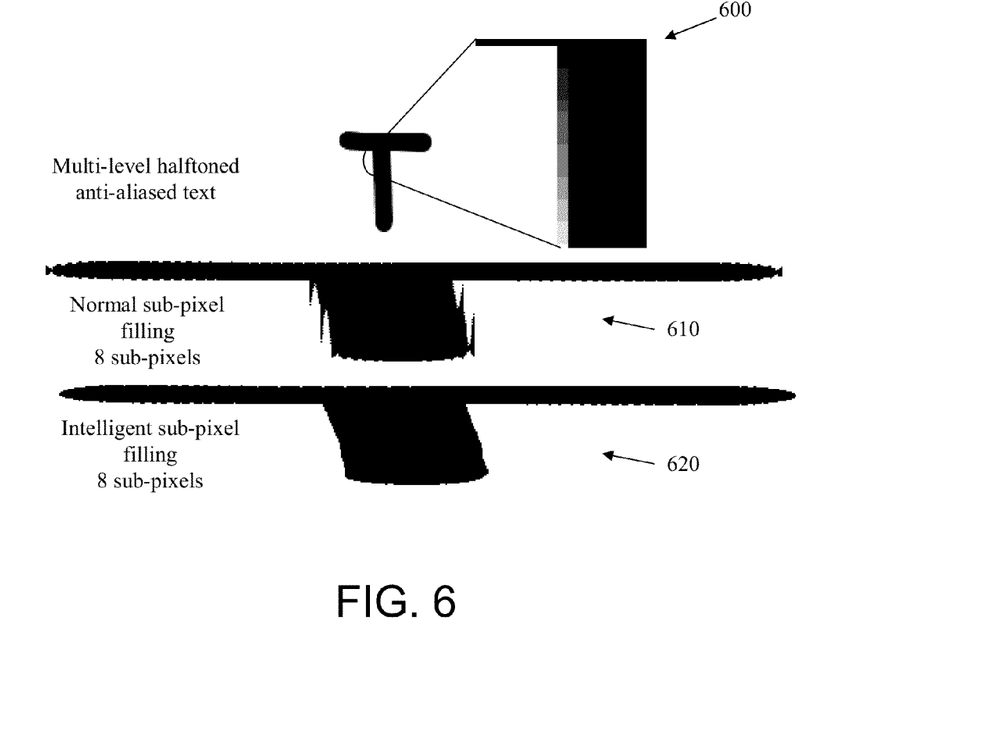
FIG. 6 is an image of an aliased letter T and the result of shifting the center of mass of the pixels of the letter T.

FIG. 6 shows a multi-level halftoned anti-aliased text 600 containing a letter T. FIG. 6 also shows a first result 610 of printing of the anti-aliased letter T, which is halftoned by means of normal sub-pixel filling with 8 sub-pixels per binary pattern according to the method in which shifting of the binary patterns is not applied.

A second result 620 is shown of printing of the anti-aliased letter T, which is halftoned by means of intelligent sub-pixel filling with 8 sub-pixels per binary pattern according to the method in which shifting of the binary patterns is applied.

According to the second result 620, the edges of the letter T becomes much sharper than the edges of the letter T according to the first result 610.

Shift values may be as fine grained, as in the above example, or as coarse as required. For example, only three shift values −1, 0 and +1 may be applied.

According to an embodiment of the method of the present invention, the method further comprises the steps of identifying binary patterns that induce print artifacts during printing and excluding the identified binary patterns from any collection of at least one binary pattern. The excluded binary patterns may differ per kind of printhead comprised in the printer used to print the image.

For print heads that are driven at a high frequency, it the ink or the ink meniscus in the ink channel may not be completely at rest during the ejection of the next ink drop. This phenomenon is called cross talk in time. If cross talk in time occurs, predetermined binary patterns may be avoided, since they will otherwise lead to print artifacts. To identify such binary patterns, a test bitmap may be composed which prints all of a relevant binary pattern in the same test bitmap and the printed test bitmap is analyzed.

Figure 7:
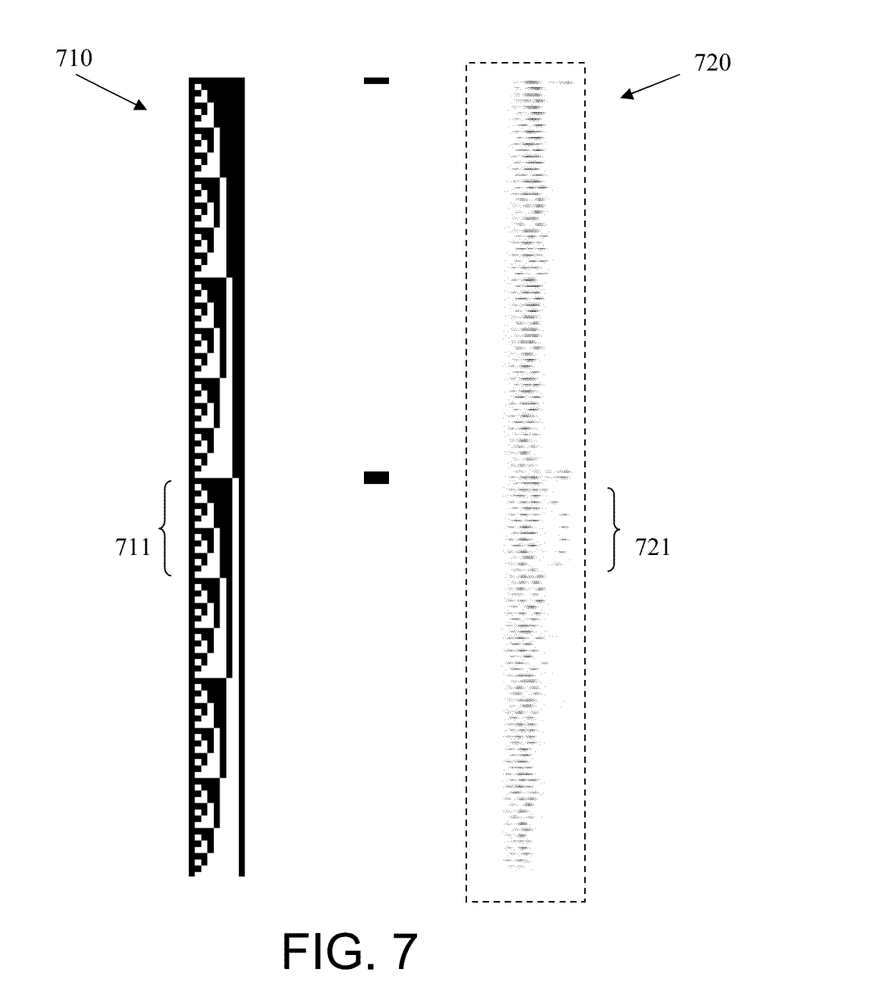
FIG. 7 is a schematic representation of a test with binary patterns on the left and the result of the test on the right.

In FIG. 7, such a test bitmap 710 is shown. On each row of the 256 rows of the test bitmap 710, a different binary pattern of eight sub-pixels is positioned. The print head may contain 256 nozzles in a nozzle row, each of which may print the binary pattern in the corresponding row in the test bitmap 710. The printed test bitmap 720 is shown on the right side of FIG. 7. In a first area 721 of the printed test bitmap, a print artifact emerges. In the first area 721, the last ejected ink drop of eight ink drops according to a binary pattern in a second area 711 of the test bitmap 710 is ejected very slowly, resulting in an ink drop on the receiving medium deviating to the right side of the first area 721 on the printed test bitmap 720. Each binary pattern in the second area 711 comprises a 2 on 1 off 1 on sub-pattern at the right side of the pattern. In an embodiment of the method according to the present invention, binary patterns comprising such a sub-pattern are not applied and are removed from any used collection of binary patterns.

Neighboring nozzles on a print head may also influence each other. This phenomenon is called cross talk in space. Cross talk in space may also lead to print artifacts such as banding. For cross talk in space, it is advantageous to apply another pattern fill order for, for example, the even and odd nozzles in a print head. When printing an image with a low coverage, binary patterns with a few sub-pixels having a value of one are used. A first pattern fill order may be selected for the even nozzles, while a second pattern fill order may be selected for the odd nozzles. Moreover, the first pattern fill order and the second pattern fill order may be such that the even nozzles always eject ink at an earlier time than the odd nozzles. In another embodiment using binary patterns of 13 sub-pixels, a first pattern fill order 8 7 6 5 10 13 12 11 9 4 3 2 1 is applied for the even nozzles and a second pattern fill order 4 3 2 1 8 7 6 5 10 13 12 11 9 is applied for the odd nozzles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of printing a continuous tone image by a printer having an asymmetric printer resolution, said method comprising the steps of:
   a) multi-level halftoning the continuous tone image by assigning a level out of a number of levels to each pixel of the image;
   b) determining the number of levels on the basis of the asymmetric printer resolution;
   c) selecting for each level a collection of at least one binary pattern, each binary pattern consisting of a plurality of sub-pixels, the number of which is determined by the number of levels;
   d) selecting for each pixel of the halftoned image a binary pattern from the collection selected for the level assigned to the pixel;
   e) transforming each pixel of the halftoned image into the selected binary pattern; and
   f) printing the binary patterns of the transformed pixels using the asymmetric printer resolution,
   wherein the binary pattern is different for pixels of the halftoned image corresponding to the same level, and
   wherein the method further includes selecting a first binary pattern of a level of the number of levels for even pixels of the halftoned image to be different than a second binary pattern of the same level for odd pixels of the halftoned image.

2. The method according to claim 1, wherein a sub-pixel of a binary pattern of a transformed pixel has a value zero or one, which binary pattern has as many sub-pixels with a value of one as the level assigned to the corresponding pixel of the halftoned image.

3. The method according to claim 1, wherein the step of selecting for each level a collection of at least one binary pattern is according to at least one pattern fill order of as many steps as the level corresponding to the selected collection, said at least one fill order starting with a binary pattern of sub-pixels all having a value of zero and each step changing the value of zero of a sub-pixel of the binary pattern into a value of one.

4. The method according to claim 3, wherein neighboring pixels have different pattern fill orders which are combinable into a two-dimensional pattern fill order.

5. The method according to claim 1, wherein a binary pattern of a pixel is determined by the levels of neighboring pixels of the pixel.

6. The method according to claim 5, wherein the binary pattern of the pixel is determined by a center of mass of each neighboring pixels.

7. The method according to claim 1, wherein the method further comprises the steps of:
   identifying binary patterns that induce print artifacts during printing; and
   excluding the identified binary patterns from any collection of at least one binary pattern.

8. A printer comprising a print controller and a print engine, wherein the print controller and the print engine are adapted to carry out the method according to claim 1.

9. The printer according to claim 8, wherein the print controller comprises an image processor adapted to carry out the steps of:
   a) multi-level halftoning the continuous tone image by assigning a level out of a number of levels to each pixel of the image;
   b) determining the number of levels on the basis of the asymmetric printer resolution;
   c) selecting for each level a collection of at least one binary pattern, each binary pattern consisting of a plurality of sub-pixels, the number of which is determined by the number of levels;
   d) selecting for each pixel of the halftoned image a binary pattern from the collection selected for the level assigned to the pixel;
   e) transforming each pixel of the halftoned image into the selected binary pattern.

10. A computer program comprising computer program code embodied on a non-transitory computer readable medium and configured to enable a printer comprising a print controller and a print engine to execute the method according to claim 1.

11. The method according to claim 1, wherein the step of selecting for each level a collection of at least one binary pattern comprises a step of using a first pattern fill order generating the first binary pattern for each level, and using a second pattern fill order generating the second binary for each level.

* * * * *

UNITED STATES PATENT AND TRADEMARK OFFICE
CERTIFICATE OF CORRECTION

PATENT NO. : 8,649,060 B2
APPLICATION NO. : 13/770597
DATED : February 11, 2014
INVENTOR(S) : Paul Kuiper It is certified that error appears in the above-identified patent and that said Letters Patent is hereby corrected as shown below:

ON THE TITLE PAGE:

Item (71), Applicant, change "OCE-Technoligies B.V., Venlo (NL)" to

--OCE-Technologies B.V., Venlo (NL)--.

Signed and Sealed this
First Day of July, 2014

Michelle K. Lee
*Deputy Director of the United States Patent and Trademark Office*